(12) United States Patent
Subbaraman

(10) Patent No.: US 7,119,672 B2
(45) Date of Patent: Oct. 10, 2006

(54) DYNAMIC VEHICLE SIGNALING DEVICE AND SYSTEM

(76) Inventor: Ramesh Subbaraman, 2591 Nixon Way, Fullerton, CA (US) 92835

( * ) Notice: Subject to any disclaimer, the term of this patent is extended or adjusted under 35 U.S.C. 154(b) by 105 days.

(21) Appl. No.: 10/794,663

(22) Filed: Mar. 5, 2004

(65) Prior Publication Data
US 2005/0195073 A1   Sep. 8, 2005

(51) Int. Cl.
*B60Q 1/34* (2006.01)
(52) U.S. Cl. ............... 340/465; 340/463; 340/464; 340/468; 340/475; 340/478
(58) Field of Classification Search ............... 340/465, 340/463, 464, 468, 475, 478, 479; 200/61.27, 200/61.38, 202, 220; 362/80, 235, 545
See application file for complete search history.

(56) References Cited

U.S. PATENT DOCUMENTS

| | | | |
|---|---|---|---|
| 4,868,719 A * | 9/1989 | Kouchi et al. | 362/545 |
| 5,712,618 A * | 1/1998 | McKenna | 340/475 |
| RE36,245 E * | 7/1999 | Stanuch et al. | 362/74 |
| 6,150,771 A | 11/2000 | Perry | 315/291 |
| 6,293,686 B1 * | 9/2001 | Hayami et al. | 362/465 |
| 6,371,636 B1 | 4/2002 | Wesson | 362/545 |
| 6,515,584 B1 | 2/2003 | DeYoung | 340/475 |
| 6,601,983 B1 | 8/2003 | Runfola et al. | 362/545 |
| 6,700,502 B1 * | 3/2004 | Pederson | 340/815.45 |
| 2002/0171543 A1 | 11/2002 | Abbe et al. | 340/468 |
| 2002/0191416 A1 | 12/2002 | Wesson | 362/555 |
| 2003/0007362 A1 | 1/2003 | Robison | 362/487 |
| 2004/0260442 A1 * | 12/2004 | Holbrook et al. | |
| 2005/0062597 A1 * | 3/2005 | Su | |

* cited by examiner

*Primary Examiner*—Hung Nguyen
(74) *Attorney, Agent, or Firm*—Kelly W. Cunningham, Esq.; Cislo & Thomas LLP (57) ABSTRACT

A turn proportioned turn signaling system for vehicles. The lamp arrays are provided signals from rotary sensors 30 from the steering column, the rack and pinion gear system, or trailer hitch mechanism that either directly affect the signaling pattern or drive a logic control unit that in turn drives the signaling pattern. The signal display panels may consist of a plurality of lamps or light emitting diodes intended to alert the surrounding people and vehicles. The display pattern selected by the logic control unit depends the magnitude and rate of turn.

8 Claims, 4 Drawing Sheets

DYNAMIC VEHICLE SIGNALING DEVICE AND SYSTEM

BACKGROUND OF THE INVENTION

1. Field of the Invention

This invention relates to sets of lights that are arranged on an external surface of an automobile or vehicle to communicate a signal to other drivers and pedestrians and in particular to such light devices that capable of illuminating in dynamic patterns to enhance the information communicated to others.

2. Description of the Related Art

Currently, turn signals on vehicles typically consist of one or more lamps or light bulbs and flash in well-established constant time intervals. The flashing light bulbs indicate the direction of turn by the sheer position of the flashing lamp in relation to the center of the vehicle. That is, information that the vehicle is turning or is about to turn to the right is communicated to other drivers and pedestrians by a flashing turn signal light located on the right-hand side of the vehicle, ordinarily both on the front-right corner of the vehicle and on the rear-right corner of the vehicle. Also, occasionally, the vehicle is equipped with similar turn signal lights on other external surfaces of the vehicle, such as the casings around the outer rearview mirrors or the like.

The lamps alone, therefore, do not indicate the direction of turn. Instead, it is their positioning in relation to the center of the vehicle that communicate the direction of the intended turn. This is insufficient when the center of the vehicle is not easily determined by others, such as in the many circumstances of limited visibility, including nighttime and during inclement weather.

The lamps themselves are also not dynamic in that they fail to communicate any information about the magnitude of the turn, the rate of turn, the speed of the car as it enters the turn or during the turn, or the direction of the car (forward or reverse) as it initiates the turn. Instead, existing turn signal lamps involve a simple flasher unit connected in series to cause the lamp to light up and turn off in regular and constant intervals.

The current turn signal lights are also only operated manually, switched on by the driver and switched off either by the driver or by a rudimentary ratcheted release mechanism. There are often instances in current signaling systems therefore when the ratcheting mechanism turns off the turn signal lamps prematurely, before the turn is complete. Likewise, there are often other instances when the mechanism does not switch off the lamp at all, such as when the turn angle is gradual or small in magnitude or when the operator mistakenly turned on the turn signal. The ratcheted release fails in the above two cases, as it is not position sensitive, magnitude sensitive, nor rate sensitive.

Another instance where the racheted system fails is when a turn in one direction is being made and an immediate turn in the opposite side has to be made; an example is when one is turning right into an intersection but have to change lanes immediately to the left.

SUMMARY OF THE INVENTION

The present invention is in a preferred embodiment a vehicle signaling system in which the turn signals are each a plurality of signaling lights and are driven by one or more detectors that measure the magnitude and/or rate of angular displacement of the steering column, linkage, or other relevant portion of the steering system of a vehicle. These measurements are passed along to the plurality of signaling lights and cause the signaling lights to emit signaling patterns that vary according to the measured magnitude and/or measured rate of the angular displacement, including for example, one or more sequential strobe lighting effects such that a locus of activated lights appears to travel in the detected direction of the turn.

The electronic connection between the first detectors and the signaling lights may optionally further involve a logic control unit that converts the measurements of the first detectors into a distinct lighting pattern according to an index of patterns. The vehicle signaling system may additionally involve detectors that sense any change in the speed of the vehicle or the direction (forward or reverse) of the vehicle, which may also contribute to the signaling pattern passed along to the signaling lights.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1A:
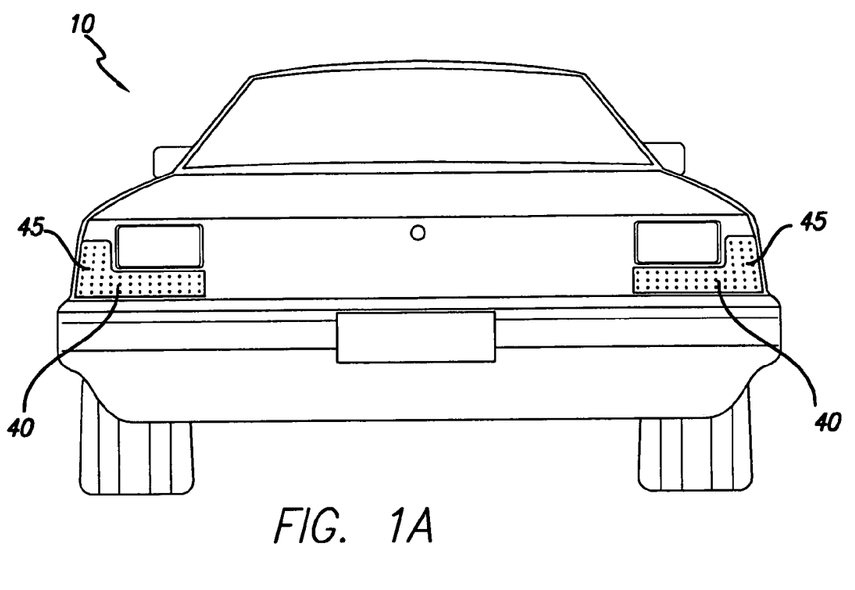
FIG. 1*a* is a front elevational view of a vehicle having turn signals in keeping with an embodiment of the present invention.
Figure 1B:
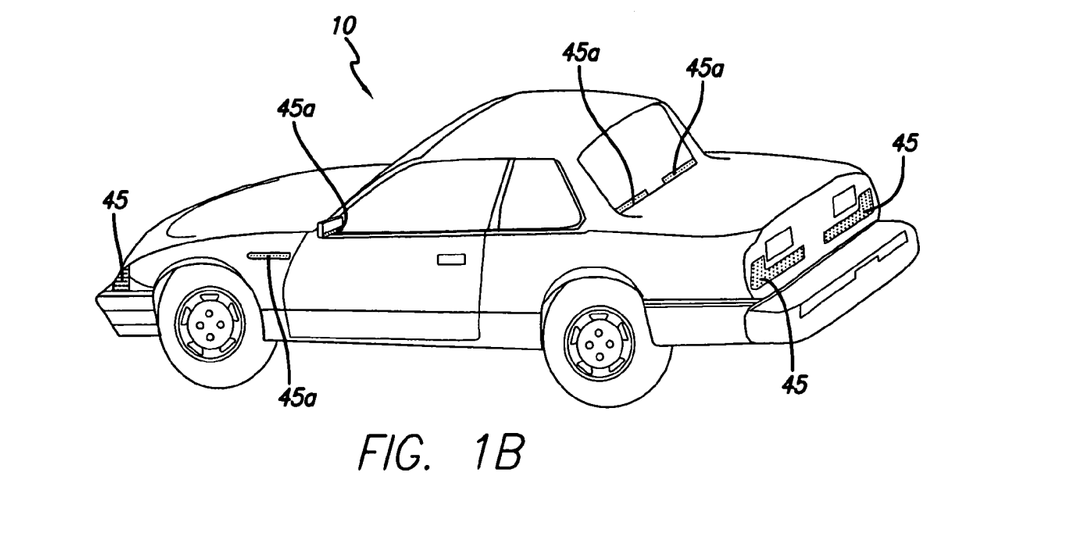
FIG. 1*b* is a perspective view of a vehicle having other signaling lights in keeping with another embodiment of the present invention.
Figure 2:
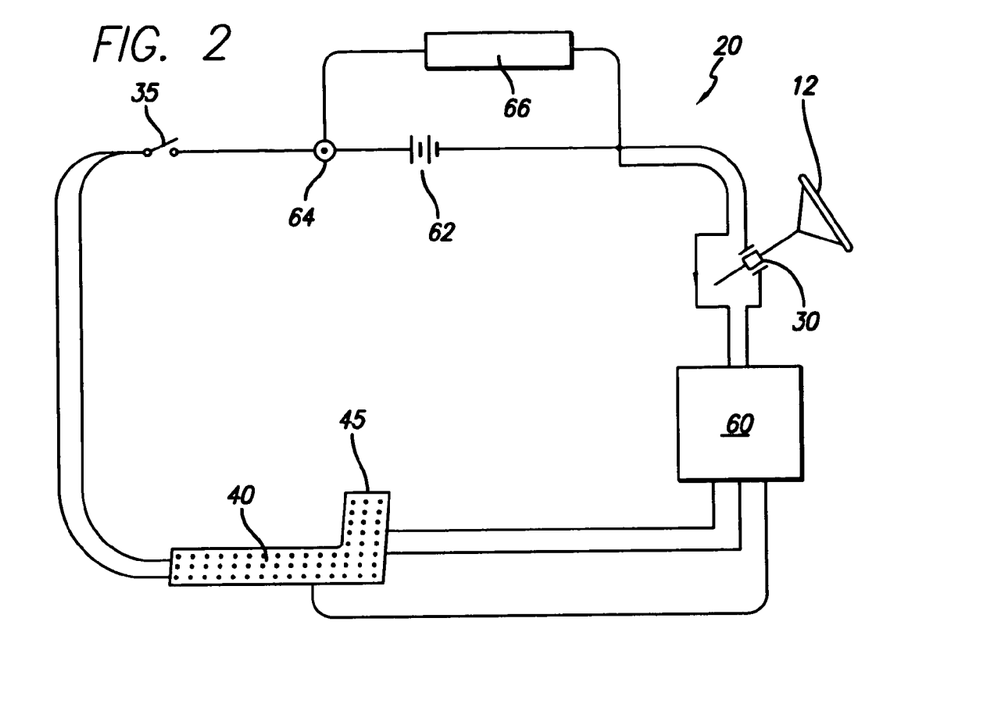
FIG. 2 is a diagram of the basic electrical circuit in keeping with the present invention.

One embodiment of the present invention is illustrated in FIGS. 1*a*, 1*b*, and 2. This embodiment is a turn signaling system 20 comprising one or more first detectors 30 in communication with signaling lights 40 in turn signal panels 45 mounted on a vehicle 10. The system is turn-proportioned such that it can provide type-specific notice to other vehicles and pedestrians of a turn, lane change, course change, or the like.

Figure 3A:
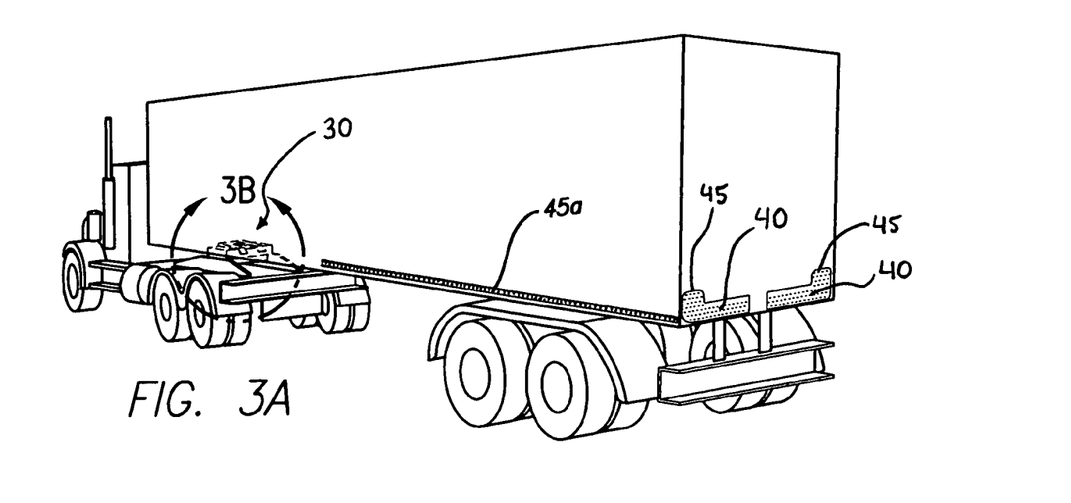
FIG. 3*a* is a perspective view of a vehicle containing another embodiment in keeping with the present invention wherein the first detectors 30 are connected to the trailer hitch assembly.
Figure 3B:
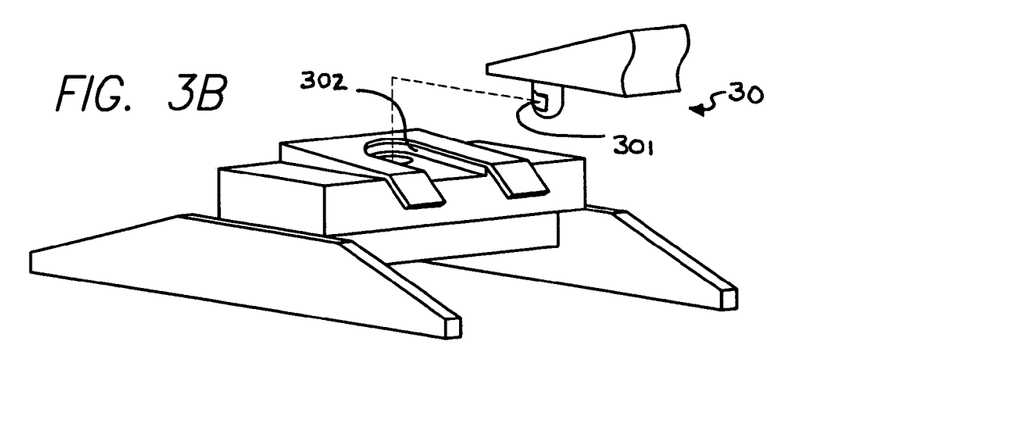
FIG. 3*b* is the embodiment shown in FIG. 3*a* showing a trailer hitch assembly in keeping with the present invention.

The system of this embodiment shown in FIG. 2 achieves these type-specific signals by employing one or more first detectors 30 that measure the magnitude and/or the rate of the angular displacement of the steering wheel, steering column, linkage, or other relevant portion of the steering system 12 of a vehicle 10 or alternatively the trailer hitch assembly of the vehicle 10 as shown in FIGS. 3A and 3B. In another embodiment, the magnitude and rate of turn of the vehicle 10 may be measured by one or more solid-state dual-axis accelerometers 30 arranged about one or more different axes. The turning of the vehicle 10 causes velocity changes about one or more of these axes, which are recorded as acceleration or deceleration by the first detectors 30.

The measurements are passed along to a plurality of signaling lights 40 and cause the signaling lights 40 to emit light patterns that vary according to the measured magnitude and/or rate of the angular displacement, including for example, one or more sequential strobe lighting effects such that a locus of activated lights appears to travel in the detected direction of the turn. The locus of activated lights could travel at a linear rate, or the locus of activated lights could travel at a non-linear rate and therefore could be made to appear to accelerate or decelerate in the direction of the detected turn. Alternatively, the locus of activated lights could appear to grow or shrink in size or in number, rather than travel, by leaving each light on once it has been activated during each blinking or strobing sequence. Similarly, the speed that the locus of lights grows or shrinks can be either linear or non-linear.

The electronic connection between the first detectors or rotary sensors 30 and the signaling lights 40 may optionally further include a logic control unit (LCU) 60 that converts the measurements of the first detectors 30 into a distinct lighting pattern, such as according to an index of patterns stored in a memory bank associated with the LCU 60.

The vehicle signaling system 20 may additionally involve one or more second detectors that detect any change in the speed of the vehicle 10. The vehicle signaling system 20 could also have other detecting means for inputting the speed of the vehicle 10, such as from the speedometer, and indicating the direction (forward or reverse) of the vehicle 10, such as from the vehicle's gearbox or reverse lights circuit, all of which may also contribute to the signaling pattern passed along to the signaling lights 40.

That is, the signals emanating from the detectors or accelerometers 30 may be fed directly to the turn signaling lights 40, such as through an amplifier circuit or the like, or they may be fed into the LCU 60 and drive. In the latter configuration, the LCU 60 would convert the input signals from the detectors, such as by matching these signals to a database of possible output dynamic lighting patterns and rates, and thereby translating the input signal into an output dynamic lighting pattern. The LCU 60 would then send the corresponding lighting patterns to the signaling lights 40, which will then flash accordingly to communicate specific characteristics of the turn, such as the magnitude of the turn, the rate of the turn, the direction of the vehicle 10, and the change in speed of the vehicle 10.

Figure 4:
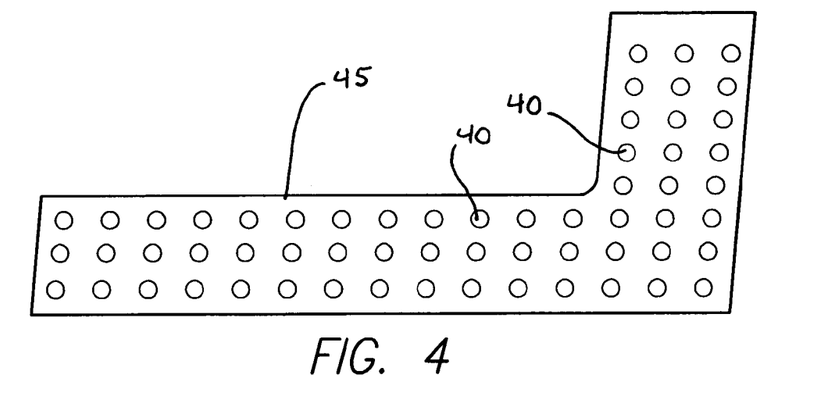
FIG. 4 is a front elevational view of a turn signal panel having a plurality of signaling lights in keeping with one embodiment of the present invention.

In one embodiment, the system consists of rotary and other angular displacement sensor(s), an LCU 60 and one or more display panels 45 located on the vehicle 10 at strategic points or places. The displays consist of a large number of lamps, such as light emitting diodes (LEDs), intended to attract the attention of other drivers and pedestrians around the vehicle 10. The display pattern is selected and driven by the LCU 60 and indexed to the magnitude and rate of turn. The front and/or rear turn signals 45 in this embodiment each comprise a plurality of signaling lights 40 such as shown in FIG. 4 although they could take on any other overall form desired by the manufacturer. The flash patterns and flash rates of these signaling lights 40 will then vary depending on the magnitude and rate of the rotation of the steering column.

In another embodiment these measurements can even be made to activate the turn signal automatically. That is, when this angular displacement meet or exceeds one or more predetermined thresholds or set point values, the left or right front, rear and side lamp panels 45 are activated automatically, without waiting for the operator of the vehicle 10 to manually switch on the turn signal lever 35. This automatic feature could also be overridden by the operator of the vehicle 10 so that the turn signals can be operated manually instead. Thus, the system could be of two types depending on the method of switching on: one in which the driver switches on the system, and the other an all-automatic method wherein the system is switched on by the detection of the steering wheel passing a predetermined threshold angle of rotation.

In one embodiment, the rotary sensor 30 will automatically turn off the light system 20 when the turn of the vehicle 10 levels off or straightens, caused by passing a predetermined threshold value point along the rotary sweep of the steering wheel in either direction. The invention also addresses the failure modes in some current turn signal light switching system. The current ratcheted release system turns off the light before the vehicle 10 has completed the turn and in some cases the ratcheted release also does not turn off the turn signal light (TSL) 45.

In another embodiment, the operator could switch on a monitoring circuit that will begin constantly monitoring these measurements for signatures typical of a vehicle 10 that is being operated by a driver who is filling asleep. If the measurements fit such a signature, then an alarm mechanism is activated to awaken the operator. The monitoring circuit could further be equipped with additional options available for the operator to elect so that, if the signature persists or is encountered a predetermined number of times within a given time period, other affirmative steps could be taken to alert or wake the operator or signal others of the danger.

The rotary sensor 30 may be one or more dual axis accelerometers or other commercially available rotational encoders. In the embodiment shown in FIG. 2, the system further comprises, a manual turn signal lever 35, battery 62, cut-out distributor 64, dynamo 66, LCU 60, corner turn signal displays 45 (left and right; front and rear), and optionally, one or more side or cowl displays 45a (left and right). The side turn signal displays could be positioned on a viewable surface of the front or rear cowling of the vehicle 10 on the external rear view mirrors. Additionally, side turn signal displays could be positioned on the front and rear windshield bottom edges. They can measure small angular increments up to a plurality of turns in each direction, such as by connecting the end of a cable-extension position transducer to the steering wheel shaft.

In another embodiment, a first detector 30 will preferably be mounted around the steering column, capable of measuring the angle of rotation of the steering wheel column; the rotary portion of the detector 30 could be mounted on the column, and the stationary portion can be affixed to any suitable body portion of the vehicle 10. This detector 30 is also capable of measuring small angular increments up to a plurality of turns in each direction.

In yet another embodiment, a detector 30 is capable of measuring the angle of rotation of the steering wheel or column, and will be preferably mounted on the column. The rotary, annular bushing, portion of the detector 30 will be mounted on the column, the column will go through the annular ring of the "slip-through" rotary encoder/detector 30. The outer annular ring, the stationary portion, will be fixed to a stationary portion of the vehicle 10. This detector 30 is also capable of measuring small angular incremental changes up to a plurality of turns in each direction.

In yet another embodiment, a detector 30 can comprise a rotary sensor as part of or assembled in the hitching mechanism of the trailer as shown in FIG. 3b. The rotary portion 301 of the detector 30 can be on the trailer and the stationary portion 302 can be located on the hitching mechanism of the towing vehicle. In this embodiment, a steering wheel, column, or such mechanism is not a component of the signaling system. Instead, the hitch comprises the rotary portion 301 and stationary portion 302 sufficient to provide a mechanism for measuring the angular displacement to drive the signaling system as described below.

In each of these embodiments, the transducer converts the steering wheel angle or stator rotor angle differential in the trailer hitch assembly into a variable voltage and thereby provides for measuring the rate of rotation, either integrally within the detector units 30 themselves, or as the result of changes in periodic signals emanating from the first detectors 30 as processed by the LCU 60. The rotary encoders or sensors 30 are capable of sensing the rotary position of the steering column with reference to a zero degree (ZD) or neutral position that indicates straightforward motion. A secondary use of the first rotary encoder 30 can be to replace the ratcheted release switch in the existing art that switches off the turn signal light system during the rotation of the steering in the opposite direction after the completion of the turn.

The ratcheted release in the existing art, in many cases, switches off the turn signal system prematurely, even when the steering wheel is slightly rotated in the direction away from the direction of the turn. The ratchet gear causes this premature switching off because the gear trigger points are present all around the column and are not limited to the effective threshold points that would switch off when the turn is effectively completed. A long-term averaging method of finding the zero degree (ZD) or neutral position of the steering column would be used to generate the threshold center point. This ZD point would serve as a reference or central point, and the other adjacent set point values would be derived from the ZD point. The passing of the first detector 30 over the adjacent set points would cause predetermined appropriate actions, such as generate a different dynamic lighting pattern or switching off the turn signal light 45 depending on the set point that is passed over.

Also, this ZD point can be used to instruct the signaling system 20 to turn off any lighting pattern that was triggered, possibly manually, but that was not accompanied by a corresponding turn of the vehicle 10. That is, when the first detector 30 registers the ZD point for a predetermined length of time, the LCU 60 can send a signal to stop any and all turn signal lighting patterns, although the signal would not stop any hazards lighting pattern. The logic controller unit would have programs and algorithms that cancel out signals not generated by real turns such as curves, winding sections, hair pin bends and switchbacks.

In one embodiment, the first detector 30 consists of at least two dual axis accelerometers 30 arranged in such a fashion that the linear axes of the two accelerometers 30 are perpendicular to each other and at least one is parallel to the linear axis of the vehicle 10 or a relevant portion of its steering system 12. It is preferred that the arranged pair of accelerometers 30 are mounted at about the front third of the car and oriented about an axis parallel to the forward driving direction of the vehicle 10. These preferred positions are found to be most sensitive due to its proximity with the center of inertial momentum of the vehicle 10 or automobile and thus will generally optimize the detection of any deviation from a constant straight forward velocity. The magnitude of a turn can then be detected by the accelerometer 30, either directly or by comparing the measurements of two accelerometers strategically placed in the vehicle 10.

In operation, the turn signal switch 35 input is designed to accept voltage levels from the vehicle's normal and existing turn signal system 20. The driver operates the lever as usual to indicate the direction of a turn, and the switch activates the rotary/steering sensors 30 and LCU 60, which in turn activate the plurality of signaling lights 40 in a lighting pattern that is proportionate to or otherwise indicative of the detected characteristics of the turn discussed above. As the characteristics change during a turn, the LCU 60 directs different lighting patterns to the plurality of signaling lights 40.

The LCU 60 may contain one or more microprocessors that accept input signals from the rotational sensor/encoders 30, the turn signal selector switch 35, and optionally the reverse light switching circuit and the speedometer mechanism of the vehicle 10. The LCU 60 translates these input signals into a distinctive dynamic lighting pattern and rate of display to send to the turn signal display panels 45. In one embodiment, the LCU 60 uses a long term averaging algorithm to determine zero rotation. The microprocessor(s) are programmable with algorithms that maintains predetermined but easily alterable threshold and transition variables, compares the input signals to these threshold and transition variables, and based thereon delivers unique and dynamic lighting patterns to the signaling lamps 40. That is, the threshold and transition variables are stored in the LCU 60 and are easily adjusted by the manufacturer of the vehicle 10 to be tailored to the tolerances, play, and responsiveness of a given make and model of the vehicle 10.

The LCU 60 may be programmed and set to receive simple commands from a table-driven program, such as DBUG, that can drive the display such that the display patterns are built by indexing combinations of unique sequences, flash patterns, rates, and even accelerations contained in a database of such variables. The patterns and rates are programmed into the microprocessor or memory units electronically connected to the microprocessor and, with a combination of commands derived from either the first rotary sensor/encoders 30 or other detectors, the array of signaling lamps 40 will light up in patterns proportionate to or otherwise reflective of the magnitude and/or the rate of the angular displacement of the steering wheel/column.

Figure 5:
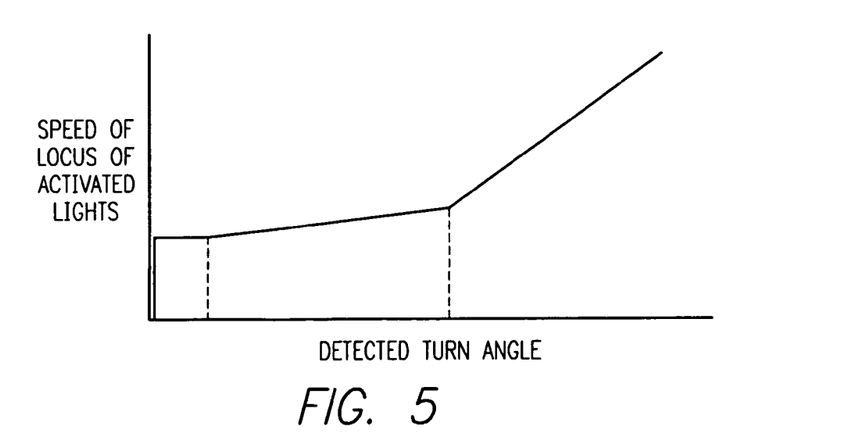
FIG. 5 is a graph showing one example of a rate of sequential lighting in a signaling pattern of one embodiment of the present invention.

FIG. 5 is a graph showing one embodiment in which the signaling lights are activated when they exceed a first threshold level, and thereafter the speed of the locus of activated lights increases as the turn angle increases and exceeds subsequent threshold levels. Another embodiment would be that of the size of the locus of activated lights increases either vertically or longitudinally as the turn angle increases. Other embodiments could combine these effects and other such effects so as to provide lighting patterns that vary as the turn angle varies.

The turn signal assemblies consist of a plurality of LED lamps, light bars or incandescent lamps aligned in such a way as to be capable of illuminating in a multitude of lighting patterns as desired by the manufacturer. The lamps or LEDs individually or in clusters are wired separately but linked collectively to illuminate in dynamic lighting patterns as directed by the LCU 60 microprocessors. In one embodiment, the lamps/LEDs or clusters are capable of lighting in serial succession giving an impression of a locus of lights that waxes, wanes, or travels across the surface of the turn signal assembly. The apparent travel of lighted LEDs or lamps is also referred to as a sequential lighting pattern.

In another embodiment, the dynamic lighting pattern drives a strip light 45a consisting of lamps or LEDs placed side by side that extend across the rear windshield or along the side or cowling of the vehicle 10, as shown in FIG. 2. The lighting pattern illuminates the strip light 45a beginning in the middle and appears to move towards the outer end of the strip light 45a in the direction of the turn, similar to the other embodiments discussed above. The wiring of the lamps or LEDs is capable of being addressed individually or a group/cluster to aid in building the dynamic lighting pattern. These lamp assemblies may be also mounted on existing rear wind spoiler edges and illuminate starting from the middle and appear to move towards the outer edge of the lamp panel, for example, when the vehicle 10 turns while moving forward, and towards the inner portion of the lamp panel when the vehicle 10 turns while moving in the reverse direction.

The turn signal panel 45 is made up of a plurality of lamps or LEDs 40 that are arranged in rows using a pitch to accommodate an optimum number of LEDs in a predetermined area to provide an effective, efficient, and attractive illumination. Two common pitch patterns are lamps or lights arrayed at the corners of a grid of squares and lamps arrayed at the corners of a grid of equilateral triangles, but any number of other pitches are contemplated by the present invention. A triangular pitched array also provides the advantages of a geometry that allows for numerous lighting patterns having both acute and obtuse corners.

Since the individual lamps or LEDs are small, the array of lamps or LEDs may be easily shaped and formed according to manufacturers' needs to be built into various laminar shapes to lie flush with the contours and edge profiles of the vehicle 10, including presently available automobiles. Alternatively, the lamps or LEDs could be connected to an array of fiber optic elements that transmit the light of the lamps to a display panel that is formed to lie flush with the contour or recessed lines of the vehicle 10. The LEDs and/or lamps will be mounted on a hard board surface and will be covered with protective lens covers.

Pairs, triples, or more of LEDs in a given column or row may be grouped together to intensify the illumination of the traveling locus. In one embodiment, the locus of light travels in the direction of the turn, and reflective of the magnitude or rate of the rotation of the steering column. That is, the locus could travel at a rate that varies according to the magnitude of the rotation of the steering column, or the number of lights lit at any given time, and thus the overall brightness of the dynamic signal, could vary according to the rate of the rotation of the steering column.

The signaling lights may be automatically activated, producing a first signaling pattern once the sensors 30 detect a turn magnitude that exceeds a first predetermined threshold value. Thereafter, throughout the turn, the signaling pattern changes as additional predetermined values are exceeded. This series of signaling patterns may then be reversed as the measured turn magnitude drops below each of these predetermined values. The first predetermined value and any number of additional is threshold values may be set up 1) based on the specifications of the vehicle's steering to actual wheel turn ratios; 2) based on one or more averaging methods run by the logic controller unit 60 and its diagnostic peripheral terminal as discussed above; or 3) other preferences and/or specifications from the manufacturer.

The first detectors 30 preferably may be located in either one of the three areas:
  1) the steering column, 2) the ratchet mechanism in the steering housing, and 3) the rack and pinion box.

The dynamic signaling system 20 could also be designed with parallel circuitry isolated from the system described above that causes the signal lights to perform like standard existing turn signals in case the dynamic signaling system 20 fails. Additionally, the driver in this embodiment can override the dynamic signaling system 20 and operate the turn signals in the standard mode similar to existing turn signal systems 20.

Figure 6:
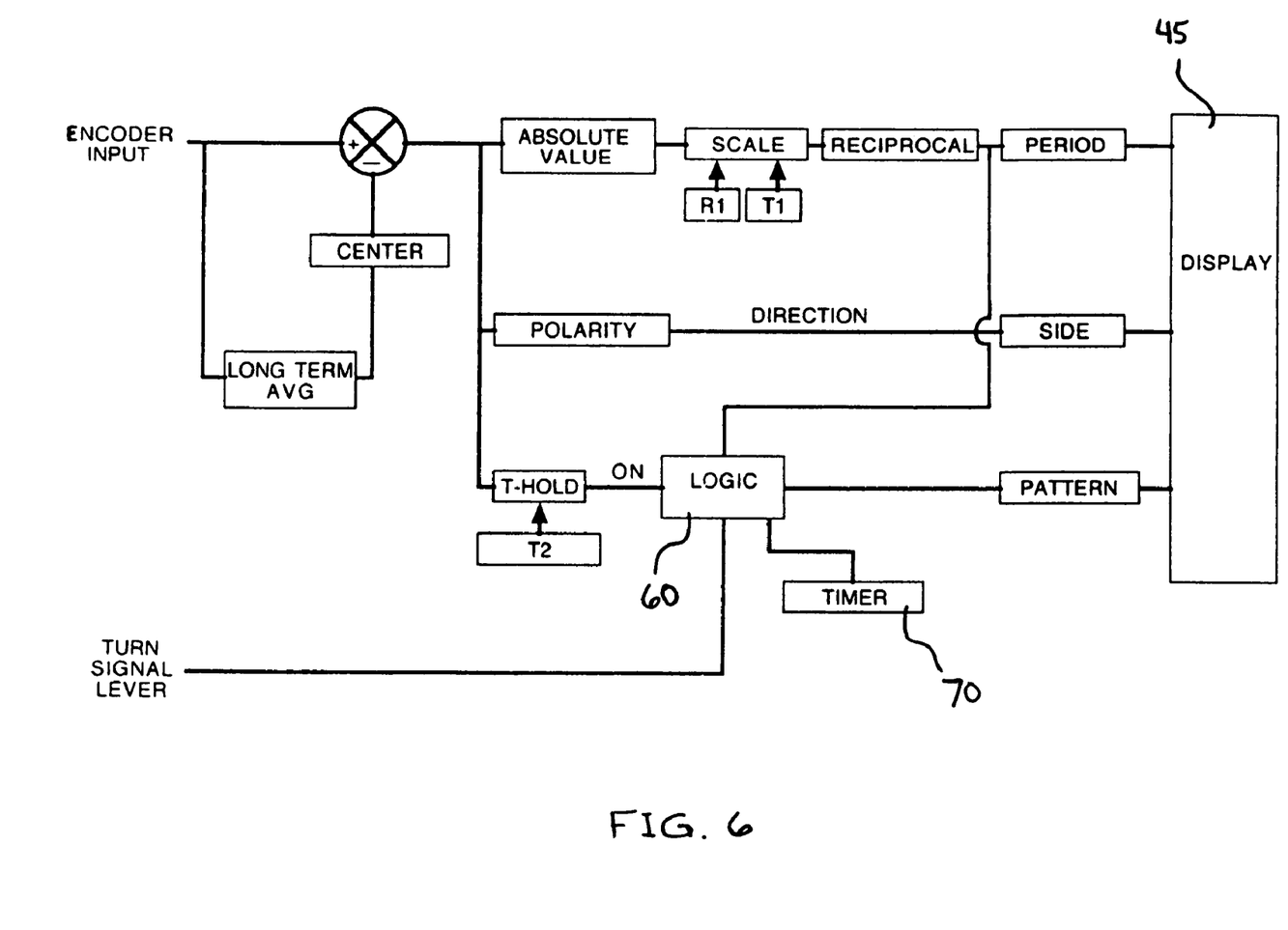
FIG. 6 is a diagram of input and output signals of a logic control unit in keeping with one embodiment of the present invention.

The turn signal switch/lever 35 and a timeout feature based on a timer 70, will also be fed into the logic controller unit 60 as shown in FIG. 6. The time-out input can operate to turn off the turn signal switch 35 in case the turn signal switch was inadvertently activated by the operator. The logic controller unit 60 in this embodiment will drive the pattern of displays. The derived pattern will be displayed on the appropriate side with the magnitude proportioned rate and speed.

The encoder input may produce a voltage ranging, for example, between zero and 5.0 volts DC that represents the steering column angle. A value of around 2.5 volts would then represent the zero angle or straight ahead. Of course, other embodiments could use any value up to the 12.0 volt DC of the standard vehicle battery or more where available. This value can be averaged over a long term (weeks, for an example) by the logic control unit 60 to calculate a value representing a zero angle. The absolute value represents the magnitude of the turn independent of the direction. This value is scaled, using R1 and T1, to a value representing the display advancement rate, which is equal to the turn angle times R1 divided by T1. The reciprocal of this rate is the time period of the display advancement. The polarity represents the direction of the turn and dictates which display panels (left or right) are illuminated.

A first threshold value represents the turn angle at which the display starts if and when the turn angle exceeds this first threshold and the display starts illuminating. This combined with the position of the turn signal lever 35 in this embodiment determines the pattern to be displayed. The display, using period, side selection and pattern generates the desired visual effect. The patterns are of the manufacturer's own algorithmic inputs. Patterns may vary from displaying the whole or only sections of the display. In this embodiment, a series of additional threshold values are predetermined and provided to the LCU 60. As the turn angle exceeds each successive additional threshold, the LCU 60 changes the lighting pattern.

In generally specifying display patterns, selective sectors of the lamp are chosen according to strategy and design. Some sectors may flash continually from the time of switching on and some flash sequentially displaying dynamism and apparent travel of certain rows or columns. The continually flashing sectors may be coordinated with the progressing sectors resulting in an orchestrated pattern. The following are just a few illustrative examples of such patterns.
  1. Pattern Example A. The bottom full-length row blinks continuously and the top and middle two full-length rows flash sequentially in a progressive manner (i.e., the locus of lights lit at any moment travels from the inner to the outer sectors of lights) and the partial end rows flash sequentially after the top and middle rows. The sequential lamps are dynamic and flash sequentially at rates that are in proportion to the magnitude/or and rate of the turn itself.
2. Pattern Example B. The outer-most columns blink repeatedly, and the remaining lights of the array sequentially light from the innermost columns to the outer-most columns of the assembly.
3. Pattern Example C. The innermost columns blink repeatedly, and the other columns flash sequentially starting from the inner columns to the outer columns.
4. Pattern Example D. The outermost columns blink repeatedly, and the inner columns light up to the levels or quantity proportionate to the magnitude or rate of the turn.
5. Pattern Example E. The outermost columns blink repeatedly when turned on at a constant rate, and when the threshold value is exceeded, the columns blink at a rate proportionate to the turn angle. The rate increases when the steering is outward and the rate decreases when the steering is inward (heading back to the ZD point).
6. Pattern Example F. The speed of the locus of activated lights increases as the turn angle increases. Another embodiment would be that of the size of the locus of activated lights increases either vertically or longitudinally as the turn angle increases. Other embodiments could combine these effects and other such effects so as to provide lighting patterns that vary as the turn angle varies.

These are just a few examples of numerous patterns and are not exhaustive and could be programmed into the microprocessor as firmware in a table matrix. The table matrix of distinct actions would be programmed and used as necessary to display and illuminate preferred patterns.

In another embodiment, the rate of the illumination is slow and accelerates slowly for small and moderately paced turns such as lane changes. The degree of steering turn required to make a lane change depends on the speed of the vehicle 10 and it is observed that the higher the speed the smaller the magnitude/degree of steering turn. An estimated amount of up to 15 degrees of steering turn would be sufficient for lane changes depending on the vehicle's velocity and acceleration in the motion. The average lane change degree would vary depending on the make and model of the vehicle 10. The average lane change degree could be derived from long term averaging with the aid of a diagnostic data collection program and provision and could be registered and used later. The registered average lane change degree mark could then serve as the basic threshold. When this threshold is crossed going from neutral/zero degree to the turn direction, the LCU 60 would initiate a faster rate or a different pattern.

In the same way, a second threshold would be averaged and registered for a 90° right angle turn. This second registered angular point will serve as the second threshold and will serve as another trigger point for different patterns and/or rates. Between these two threshold points would be a number of preset or calculated transition threshold points such that when the detector signals exceed a transition point, the LCU 60 changes the lighting pattern being sent to the signaling lights 40.

In another embodiment, the direction of progression of light in the lamp cluster would be inward for vehicles moving in a reverse direction. This would be the converse of the direction of progression of the lighting pattern for when the vehicle 10 is moving in a forward direction. As a result, the reverse direction of the vehicle would be more noticeable to others. In such a case, the LCU 60 would derive information from the reverse gear shift lever switch, the reverse light circuit, or the reverse alarm circuit, which is already provided and available in many vehicles.

While the present invention has been described with regards to particular embodiments, it is recognized that additional variations of the present invention may be devised without departing from the inventive concept.

What is claimed is:

1. A vehicle signaling system comprising:
one or more first detectors that measure angular displacement of a portion of a vehicle, said angular displacement having a fixed or varying magnitude and a rate of change of magnitude; and
a plurality of signaling lights in communication with said one or more first detectors that emit more than one distinctive signals as a function of said magnitude of said angular displacement; further comprising,
a logic control unit in communication with said one or more first detectors and said plurality of lights, wherein said magnitude of said angular displacement is translated into a distinct dynamic lighting pattern reflective of said magnitude or rate;
wherein said distinct dynamic lighting pattern comprises a sequential lighting pattern such that a locus of activated lights appears to travel in a direction of a detected turn; and
wherein the speed of the apparent movement of said locus of activated lights travels at a non-linear rate over the plurality of signaling lights.

2. A vehicle signaling system according to claim 1 further comprising one or more second detectors in communication with said plurality of signaling lights, wherein said one or more second detectors measure a change of speed of said vehicle, if any, and wherein said more than one distinctive signals additionally reflect said change in speed of the vehicle.

3. A vehicle signaling system according to claim 1 further comprising detecting means in communication with said plurality of signaling lights for detecting whether said vehicle is traveling in a forward or in a reverse direction, wherein said more than one distinctive signals additionally reflect said detected direction of said vehicle.

4. A vehicle signaling system according to claim 1 wherein said plurality of signaling lights emit more than one distinctive signals as a function of said magnitude or rate of change in magnitude of said angular displacement.

5. A vehicle signaling system according to claim 1 further comprising a means for comparing said magnitude of angular displacement and a first predetermined value and automatically activating said plurality of lights when said angular displacement exceeds said first predetermined value.

6. A vehicle signaling system according to claim 5 further comprising a means for comparing said magnitude of angular displacement and one or more additional predetermined values and automatically changing said distinct lighting signal when said magnitude or rate of the angular displacement exceeds any of said one or more additional predetermined values.

7. A vehicle signaling system according to claim 1 further comprising a means for comparing said magnitude of angular displacement and a predetermined release value and automatically deactivating said plurality of lights when said angular displacement drops below said predetermined release value.

8. A vehicle signaling system according to claim 1 further comprising a timer unit and a means for determining the zero degree measurement of said one or more first detectors and automatically deactivating said plurality of lights when said one or more first detectors detect said zero degree measurement for a predetermined amount of time.

* * * * *